(12) United States Patent
Oskam et al.

(10) Patent No.: US 11,759,294 B2
(45) Date of Patent: Sep. 19, 2023

(54) INDIVIDUALIZED DENTAL IMPRESSION TRAY

(71) Applicant: SIRONA DENTAL SYSTEMS GMBH, Bensheim (DE)

(72) Inventors: Thomas Oskam, Schaffhausen (CH); Vanik Kaufmann-Jinoian, Stein (CH)

(73) Assignee: DENTSPLY SIRONA INC., York, PA (US)

( * ) Notice: Subject to any disclaimer, the term of this patent is extended or adjusted under 35 U.S.C. 154(b) by 0 days.

(21) Appl. No.: 16/306,753

(22) PCT Filed: Jun. 2, 2017

(86) PCT No.: PCT/EP2017/063429
§ 371 (c)(1),
(2) Date: Dec. 3, 2018

(87) PCT Pub. No.: WO2017/207748
PCT Pub. Date: Dec. 7, 2017

(65) Prior Publication Data
US 2019/0125500 A1 May 2, 2019

(30) Foreign Application Priority Data
Jun. 3, 2016 (DE) .................... 10 2016 209 828.4

(51) Int. Cl.
*A61C 9/00* (2006.01)
*A61C 13/00* (2006.01)
*B33Y 50/02* (2015.01)

(52) U.S. Cl.
CPC ............ *A61C 9/0006* (2013.01); *A61C 9/004* (2013.01); *A61C 13/0004* (2013.01);
(Continued)

(58) Field of Classification Search
CPC .............................. A61C 9/0006; A61C 9/004
See application file for complete search history.

(56) References Cited

U.S. PATENT DOCUMENTS 2,312,171 A * 2/1943 Jochum ............... A61C 9/0006
433/35
3,473,225 A 10/1969 Deushle
(Continued)

FOREIGN PATENT DOCUMENTS

DE 10004415 A1 8/2001
DE 102014102770 A1 9/2015
(Continued)

OTHER PUBLICATIONS

Written Opinion of the International Searching Authority; PCT/EP2017/063429; Sep. 5, 2017 (completed); dated Sep. 15, 2017.
(Continued)

*Primary Examiner* — Ralph A Lewis
(74) *Attorney, Agent, or Firm* — DENTSPLY SIRONA INC.

(57) ABSTRACT

The invention relates to a method for producing an individualized dental impression tray and to one such impression tray, wherein a digital impression tray model of an individualized impression tray is created on the basis of a digital jaw model, the impression tray model has a carrier with at least one inner surface which at least partially corresponds to a negative form of the jaw model, at least one surface subregion on the inner surface is marked by hand or automatically detected, a retaining structure is arranged above and/or below the surface subregion, the impression tray model is stored with the retaining structure as a production template, and the impression tray is produced by machining according to the production template. The retaining structure has a first surface which extends substantially parallel to the surface subregion or substantially in line with the surface subregion and has at least one recess running through it, wherein a depression adjoins each recess of the first surface, the depression extends from the recess in the
(Continued)

direction of the carrier and/or into the carrier, and each depression has at least one undercut.

21 Claims, 2 Drawing Sheets

(52) U.S. Cl.
CPC .......... *A61C 13/0019* (2013.01); *B33Y 50/02* (2014.12); *A61C 13/0006* (2013.01)

(56) References Cited

U.S. PATENT DOCUMENTS

| | | | | |
|---|---|---|---|---|
| 5,336,086 A | * | 8/1994 | Simmen | A61C 9/0006 433/37 |
| 5,478,235 A | * | 12/1995 | Schuldt | A61K 6/90 433/37 |
| 5,752,826 A | * | 5/1998 | Andreiko | A61C 9/0006 433/37 |
| 5,890,895 A | * | 4/1999 | Tucker | A61C 9/0006 433/37 |
| 6,875,016 B2 | * | 4/2005 | Burgio | A61C 9/0006 433/37 |
| 10,311,162 B2 | * | 6/2019 | Fisker | G06F 30/00 |
| 2003/0180679 A1 | | 9/2003 | Burgio | |
| 2010/0151408 A1 | * | 6/2010 | Gramann | A61C 9/0006 433/37 |
| 2014/0277665 A1 | * | 9/2014 | Fisker | G06F 30/00 700/98 |

FOREIGN PATENT DOCUMENTS

| | | |
|---|---|---|
| EP | 2736448 B1 | 9/2015 |
| GB | 2443604 A | 5/2008 |
| JP | 2015066258 A | 4/2015 |
| WO | 2013026600 A1 | 2/2013 |

OTHER PUBLICATIONS

International Search Report dated; PCT/EP2017/063429; Sep. 5, 2017 (completed); dated Sep. 15, 2017.
International Preliminary Report on Patentability (IPRP) Chapter I; PCT/EP2017/063429; Sep. 5, 2017 (completed); dated Sep. 15, 2017.

* cited by examiner

INDIVIDUALIZED DENTAL IMPRESSION TRAY

TECHNICAL FIELD

The invention relates to an individualized dental impression tray having a carrier with an outer surface and an inner surface, wherein the inner surface at least partially corresponds to a negative form of a part of an individual set of teeth and at least a first part of the inner surface is covered with a retaining structure.

BACKGROUND OF THE INVENTION

To create an impression of a set of teeth or a region of a set of teeth, the use of an individualized impression tray with a curved carrier that follows the shape of the mandibular arch and has individualized surfaces facing the teeth is well known. The carrier accommodates a soft, hardenable impression compound. To ensure that the impression compound stays in the carrier after hardening and can be removed from the teeth along with said carrier, a retention force is needed. This can be accomplished with the aid of an adhesive, which is applied to the inner surface of the carrier and holds the impression compound on the carrier. Another option is to arrange holes in the surface of the carrier. While the impression is being taken, a portion of the impression compound is pressed out through the holes, as a result of which the impression compound is firmly attached to the carrier after hardening.

An impression tray, on the inner surface of which anchor elements are arranged, is known form U.S. Pat. No. 6,875,016 B2. The anchor elements are arc-shaped and are distributed over the surface, so that the impression compound in a not yet hardened state flows around the anchor elements and in particular also fills in a space below each arc. When the impression material is hardened, the holding force between the impression compound and the impression tray is increased as a result of the arc-shaped elements. Therefore, an additional adhesive is not needed.

The object of the present invention is to further develop the state of the art and provide an impression tray that is easy to use and also to ensure good adhesion of the impression compound to the tray.

SUMMARY OF THE INVENTION

The invention relates to a method for producing an individualized dental impression tray. A digital first impression tray model of an individualized impression tray is created using a digital jaw model or a digital jaw region model. The first impression tray model comprises a carrier having at least one inner surface, which corresponds at least partially to a negative form of the jaw model or jaw region model.

At least one surface subregion on the inner surface is marked by hand and/or automatically and a retaining structure is arranged above and/or below said at least one surface subregion. The first impression tray model is stored with the retaining structure as a production template and the impression tray is produced by machining according to the production template.

The retaining structure has a first surface which extends substantially parallel to the surface subregion or substantially in line with the surface subregion and has at least one recess running through it, wherein a depression adjoins each recess and extends from the recess in the direction of the carrier and/or into the carrier and has at least one undercut.

An individualized impression tray is characterized in that the inner surface of the carrier is at least partially adapted to the form of an individual set of teeth. The carrier of the impression tray is therefore produced on the basis of a digital jaw model or jaw region model in such a way that the at least one inner surface of the carrier approximates the outer contour of the jaw model or jaw region model as much as possible. The carrier can comprise an inner surface corresponding to the lower jaw or the upper jaw, for example, or also two opposing inner surfaces, wherein the one corresponds to the lower jaw, while the other corresponds to the upper jaw. Impression trays with two opposing inner surfaces for the upper and the lower jaw are often also referred to as Triple Tray or dual arch impression trays, and allow an impression of the lower jaw and the upper jaw to be taken at the same time.

A distance of 0.5 mm to 3 mm between the inner surface of the carrier and the outer contour of the jaw model or jaw region model is typical or desirable. For some applications or in some regions, a distance of only 0.1 mm can be desirable as well.

The jaw model or the jaw region model for producing the individualized impression tray can have been created in any number of ways. It is created on the basis of an impression made with a generic impression tray, for example, i.e. using an impression tray having a general, non-individualized shape. Because of the large amount of impression compound that is necessary for an impression using a generic impression tray, and the potentially non-uniform distribution or thickness of the impression compound between the teeth, the adjoining gums and the carrier, the model obtained using a generic impression tray is not sufficiently accurate for some applications. In particular for the production of rigid structures covering larger areas, such as large bridges or a removable partial denture, for example, such a model is not sufficiently accurate.

The individualized impression tray, on the other hand, ensures that the impression compound is distributed at least over the entire individualized region with a thickness that is as uniform and small as possible, so that pressure that is as high and uniform as possible can be exerted on the impression compound. A high accuracy of the obtained impression or model of the teeth and the adjoining gums is thus achieved.

The at least one surface subregion is defined by a user with the aid of a suitable input means, or automatically on the basis of predetermined criteria, on the inner surface of the carrier in order to arrange the retaining structure, which is intended to ensure the adherence of the impression compound on the carrier of the impression tray after hardening, on said surface subregion. It is also possible for the entire inner surface of the carrier to be marked as a surface subregion and provided with a retaining structure.

The holding force is achieved by the penetration of impression compound into the undercuts of the retaining structure. In this case, undercut refers to a partial volume of a depression, which is located behind or below the first surface in an undercut manner. The undercut is thus located in a projection behind the first surface which extends substantially perpendicular to the first surface, or is covered by the first surface. The undercut can be located on only one side of the recess, i.e. occupy only a subregion of a side wall of the depression that adjoins an edge of the recess. An undercut can also extend over the entire region of the side walls directly adjoining the edge of the recess, e.g. in the case of a circular cone-shaped depression. A depression can also have a plurality of undercuts which are separated from one another, or separated by side walls without undercuts. Two opposing side walls of the depression can have an undercut configuration, for example, while the respective interjacent side walls extend perpendicular to the first surface.

The strength of the retention force achieved by means of the retaining structure is therefore substantially determined by the undercuts, i.e. the shape, size and number or density of the undercuts, in the marked region. The shape, size and density of the undercuts, and correspondingly also the shape and size of the depressions as well as the density of the recesses over the surface subregion, can be constant or can also vary. It is possible, for example, to place a retaining structure with larger undercuts or a higher density of undercuts in particularly loaded regions of the inner surface, i.e. in surface regions on which particularly large forces act when the impression is removed from the teeth and the gums, in order to achieve a greater retention force than in other less loaded surface regions. A high holding force is necessary, for example, for surfaces that extend perpendicular to an insertion direction of the impression tray whereas, for surfaces that extend parallel to the insertion direction, a lesser holding force suffices. The insertion direction in this case is the direction in which the impression is placed onto or removed from the jaw or jaw region.

The shape and size of the undercuts can, for example, be characterized by an angle to be specified relative to the first surface, at which the undercut extends under the first surface. The undercuts can also be configured such that two or also more depressions, which respectively originate from different recesses, are connected to one another.

The recesses, their shape and in particular their size ensure the penetration of the impression compound into the depressions and thus also into the undercuts. An adaptation of the size and/or the shape of the recesses to the viscosity of the impression compound is therefore advantageous. Recesses with a size of 0.5 mm to 2 mm and/or depressions with a depth of 0.5 to 2 mm can typically ensure that the impression compound flows into the undercuts.

It should be noted that the first surface of the retaining structure extends only substantially parallel to the surface subregion; i.e. an averaged alignment of the surface extends approximately parallel to the selected or marked surface subregion or substantially coincides with said surface subregion. This ensures that, in the region provided with a retaining structure, the production template, and therefore also the produced impression tray, deviates only as minimally as possible from the originally identified individualized shape, i.e. the original first impression tray model.

It goes without saying that all the parameters of the retaining structure can be generated or configured by hand and/or also automatically. It also goes without saying that the height of the retaining structure, or the first surface of the retaining structure, can vary. Different subregions of the first surface can extend parallel to the surface subregion at different distances, so that the retaining structure in different regions is configured with different thicknesses. As a result, the region or the size of the undercuts, and with it the holding force that can be achieved by the retaining structure, can be regionally customized.

The retaining structure can be selected, created and/or arranged as a finished three-dimensional model. This means that a three-dimensional virtual structure is generated or was generated in advance for selection, which is then placed on the surface subregion of the carrier or is partially or completely placed into the carrier via appropriate recessing of the surface subregion. The structure can be selected from a series of previously created structures, for example, each of which comprises a first surface that has a predetermined density of recesses, depressions of a predetermined shape and size that adjoin the recesses and an underside which extends at a distance to the first surface. The side surfaces or the size of the first surface and the underside can then be adapted automatically, for example, to the shape and size of the selected surface subregion during placement.

The retaining structure can alternatively be produced by creating the recesses and the adjoining depressions with undercuts in the impression tray model via the subtraction or removal of carrier material in the marked surface part.

A firm attachment between the carrier and the hardened impression compound is achieved by means of the undercuts of the retaining structure. An adhesive and the additional work step of applying the adhesive are thus unnecessary, and a particularly simple use of the produced impression tray is made possible. Moreover, due to the closed form of the inner surface of the carrier without any through holes, a large amount of pressure on the impression compound can be produced. This makes a particularly clean and detailed image of the set of teeth and the adjacent gums possible.

By integrating the retaining structure into the production template, the individualized impression tray is produced directly with the retaining structure; there is therefore also no need for an additional production step, with which a retaining structure could subsequently be placed into or on a manufactured individualized impression tray. Arranging the retaining structure on the impression tray model represents a simple, easily controllable work step, which can be performed manually or also completely automatically by means of a computing unit, as a result of which the method according to the invention can be carried out particularly quickly and cost-effectively. Furthermore, due to the flat arrangement of the undercuts, a small height of the structure is sufficient to achieve the required retention force between the carrier of an impression tray and an impression compound hardened within it.

The retaining structure advantageously has a plurality of recesses, wherein a density, a shape and a size of the recesses and a shape and size of the undercuts can be specified automatically and/or manually.

The retention force can generally be influenced by changing the undercuts themselves and by changing the density of the undercuts. In particular the shape and size of the undercuts and the density, i.e. the number of recesses or undercuts arranged on the surface subregion, determine the retention force. In order to ensure the penetration of the impression compound into the depressions and undercuts, the size and shape of the recesses must be adapted to the impression compound, in particular to the viscosity thereof. By specifying or selecting the various parameters, a user can create the retention force that can be achieved with the retaining structure by hand or automatically via a computing unit. Different shapes, sizes and densities for undercuts and recesses can be selected by a user from a list, for example. It is also possible to provide a selection or specification of a desired holding force, wherein the parameters of the retaining structure are generated automatically depending on the desired retaining structure. A completely automatic generation of the parameters is possible as well.

After marking, the at least one surface subregion is advantageously recessed by a depth into the carrier relative to the part of the inner surface not belonging to the surface subregion, wherein the retaining structure, which is subsequently arranged on the at least one surface subregion, has a height relative to the surface subregion, which corresponds exactly to the depth of recessing. The retaining structure with the undercuts is thus recessed into the carrier in such a way that the first surface of the retaining structure is flush with the remaining inner surface of the carrier. As a result, the difference between the production template and the original individualized impression tray region, in particular in the individualized region of the inner surface, is minimized. Similarly, an interfering and/or quality-reducing influence of the retaining structure is decreased by an at least regional reduction or increase of the distance between the impression tray and the teeth or gums when the impression tray is used.

A plurality of surface subregions are advantageously marked by hand and/or automatically and respective identical and/or different retaining structures are arranged above and/or below the different surface subregions, wherein the different retaining structures particularly advantageously differ with respect to a density of the recesses and/or the shape of the recesses and/or the size of the recesses and/or with respect to the shape of the undercuts and/or with respect to the size of the undercuts. Non-contiguous regions or regions for different retaining structures can be set in a simple manner by hand or automatically, for example, in order to achieve different retention forces for the respective regions. It is particularly advantageous to select the retaining structure for at least one of the plurality of surface subregions depending on a maximum force acting on the surface subregion when the impression tray is being used and/or depending on a desired holding force for the surface subregion and/or depending on a viscosity of an impression compound to be used for creating an impression. In particular when removing the impression tray with the impression compound from a jaw region to be measured, there is the risk that the impression compound detaches from the inner surface of the impression tray and remains stuck to a part of the jaw region. The acting maximum force in different regions of the inner surface differs significantly. Similarly, to prevent the impression compound from detaching from the impression tray, retention forces of different strengths are needed in different regions of the inner surface of the impression tray. The viscosity of the impression compound additionally also influences the forces acting on the impression compound, or the retention force needed when the impression tray with impression compound is removed from a jaw region.

The retaining structure advantageously consists of a plurality of adjacently arranged retaining elements, wherein a three-dimensional shape of the retaining elements and/or a density of the retaining elements are specified automatically and/or by hand. This represents a further alternative to the design of the retaining structure. The adjacently arranged retaining elements join together to form the retaining structure, wherein each retaining element comprises an element base, an element upper side and side walls, and the elements are arranged with the element bases on the marked surface subregion of the carrier structure or on an equivalent to the surface subregion which is recessed into the carrier. The first surface of the retaining structure correspondingly consists of the element surfaces of the retaining elements. The gaps formed between the retaining elements produce the recesses of the first surface and the depressions and undercuts. The retaining elements can be arranged evenly spaced, at variable distances and/or partially in contact with one another. Since the retention force is correspondingly dependent on the density of the retaining elements, the retention force can be controlled via the specification, selection and/or variation of the density of the retaining elements.

It goes without saying that each retaining element comprises at least one side wall, which extends in an undercut manner with respect to the element surface. The retaining elements can be designed to be rotationally symmetric, for example, so that the undercut region or the undercut extends across all the side walls of each retaining element and all the depressions and optionally also all the recesses are correspondingly connected to one another. The retaining elements can, for example, also comprise two opposing side walls, which extend parallel to one another or perpendicular to the element surface, and two side walls, which are undercut. Such retaining elements can also be arranged with the parallel or perpendicularly extending side walls adjacent to one another in such a way that, with respect to the depressions and recesses, parallel channels are produced.

The impression tray is advantageously produced according to the production template by means of an additive manufacturing method. Additive manufacturing methods, which are also referred to as generative manufacturing methods, e.g. 3D printers, represent a particularly simple way of producing the impression tray with an integrated retaining structure in one piece and in one method step.

It goes without saying that subtractive manufacturing methods can also be used to produce the retaining structures of the impression tray or, in particular, the undercuts.

A further object of the invention is an individualized dental impression tray having a carrier with an inner surface, wherein the inner surface at least partially corresponds to a negative form of a part of an individual set of teeth and the adjoining gums and at least one surface subregion of the inner surface is covered with a retaining structure. The retaining structure has a first surface which extends substantially parallel to the surface subregion or substantially in line with the surface subregion and has at least one recess running through it, wherein a depression adjoins each recess of the first surface, the depression extends from the recess in the direction of the carrier and/or into the carrier, and each depression has at least one undercut.

The individualized dental impression tray possesses all the advantages and characteristics mentioned within the framework of the description of the method according to the invention regarding an individualized impression tray having the relevant properties.

50% of the surface subregion is advantageously covered by the first surface and 50% of said surface subregion is covered by the recesses. A size of the recesses sufficient to ensure that the impression compound penetrates completely into the depressions, and therefore also into the undercuts, is thus achieved.

The undercuts advantageously extend under at least 30% of the first surface. The larger the region of the undercuts or the larger the size of the undercuts, the greater the retention force.

The retaining structure advantageously consists of a plurality of adjacently arranged retaining elements. It goes without saying that all the retaining elements respectively have an element surface, which together form the first surface, and that the recesses of the first surface and the adjoining depressions are the result of the distances between the retaining elements. This does not exclude individual or a plurality of retaining elements also partially being arranged adjacent to one another. It further goes without saying that each retaining element respectively comprises a region that is undercut with respect to the element surface, which results in an undercut of the retaining structure.

The retaining elements are advantageously designed to be T-shaped or X-shaped or V-shaped. These shapes represent simple forms for retaining elements with at least two undercut regions or undercuts. If the retaining elements are designed to be rotationally symmetric, one undercut respectively extends across all the side walls of the retaining element for each retaining element.

The surface subregion advantageously occupies at least 50% of the inner surface of the carrier. The greater the proportion of the surface subregion and thus also of the retaining structure on the inner surface of the carrier, the greater the restoring force that can be achieved for an impression compound hardened in the impression tray.

A distance between the first surface of the retaining structure and the surface subregion of the inner surface of the carrier and/or a base of the at least one depression is advantageously 0.1 mm to 0.5 mm. Due to the flat arrangement of the retaining structure or the undercuts, a small depth of the retaining structure, significantly less than 1 mm, is already sufficient to achieve the required holding force between the carrier of an impression tray and an impression compound hardened within it. The larger the part of the inner surface of the carrier covered by the retaining structure and the more recesses or undercuts arranged in the region of the retaining structure, the smaller the depth of the retaining structure can be.

The surface subregion is advantageously configured as the base of a depression in the inner surface of the carrier, wherein a depth of the depression corresponds to an extent of the retaining structure perpendicular to the first surface of the retaining structure. As a result, the first surface of the retaining structure merges continuously into the remaining surface of the carrier.

The retaining structure and the carrier are advantageously formed as a single piece.

BRIEF DESCRIPTION OF THE DRAWINGS

Design examples of the invention are illustrated in the drawing. The figures show.

DETAILED DESCRIPTION OF THE INVENTION

Figure 1:
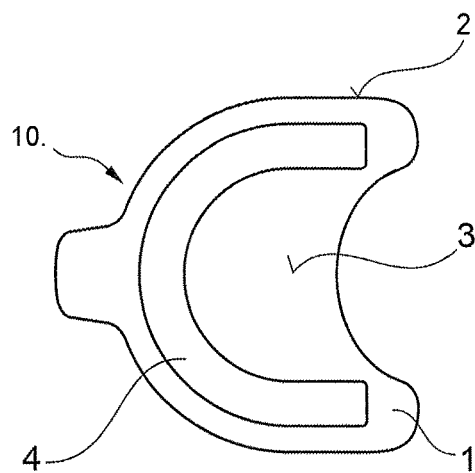
FIG. 1 a dental impression tray with a retaining structure,
FIG. 2 a first embodiment of the retaining structure,
FIG. 3A,B further embodiments of the retaining structure,
FIG. 4A,B two embodiments of an impression tray placed onto a lower jaw,
FIG. 5 a schematic representation of the method steps.

FIG. 1 shows an individualized dental impression tray 10 with a carrier 1 for accommodating an impression compound. The carrier comprises an outer surface 2 and an inner surface 3, wherein the inner surface 3 corresponds to the set of teeth and the adjacent gums of a patient (not depicted) at least in regions. A part of the inner surface 3 is covered by a retaining structure 4.

Figure 2:
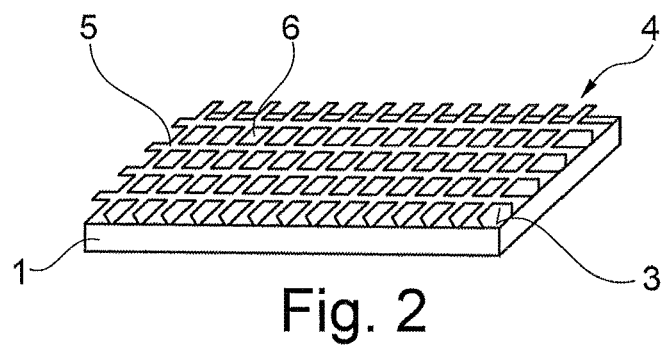

A first embodiment of the retaining structure 4 is outlined in FIG. 2. The retaining structure 4 disposed on the inner surface of the carrier 1 comprises a first surface 5. In the design example illustrated, the first surface 5 extends substantially parallel to the inner surface 3 of the carrier 1. The first surface 5 of the retaining structure has recesses 6 with adjoining depressions running through it. The recesses 6 are rectangular-shaped and uniformly arranged, so that the first surface 5 has the form of a grid. Each depression comprises at least one side surface that extends obliquely relative to the inner surface 3 and a resulting undercut.

It would also be possible for the surface 5 to coincide with, i.e. be identical to, the inner surface 3 of the carrier in the region of the retaining structure 4, wherein the depressions extend into the carrier.

Figure 3A:
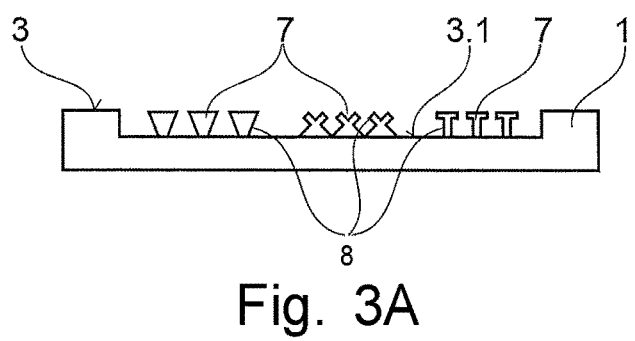

Three further design examples of the retaining structure 4 are outlined in FIG. 3A. In all three design examples, the retaining structure 4 is formed from a plurality of retaining elements 7, which are arranged adjacent to one another on a surface 3.1 that is recessed relative to an original inner surface 3. FIG. 3A shows three adjacently arranged retaining elements 7 per design variant in profile. The retaining elements 7 are designed to be V-shaped, X-shaped and T-shaped, so that each retaining element 7 comprises at least two undercuts 8. It goes without saying that the retaining elements can also have four undercuts, or an undercut that extends all the way around.

Figure 3B:
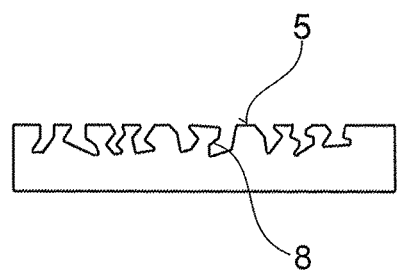

The embodiment of a retaining structure 4 outlined in FIG. 3B comprises a plurality of recesses 6, which are arranged irregularly on the first surface 5 and to which tubular, curved and respectively differently shaped depressions, each having at least one undercut 8, are connected. Such a retaining structure 4 can be produced by randomly distributing recesses and randomly arranging tubular, curved depressions in the carrier, for example, or by randomly subtracting tubular, curved depressions from the carrier material.

Figure 4A:
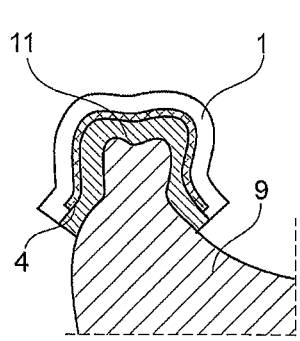

FIG. 4A shows a sectional view of an impression tray 10 according to the invention placed on a lower jaw 9. The carrier 1 and the retaining structure 4 arranged on the inner surface 3 of the carrier 1 comprises an enlarged negative form of a subregion of the lower jaw 9. In the depicted design example, the retaining structure 4 is recessed in the carrier 1 of the impression tray 10 in such a way that the first surface 5 of the retaining structure 4 is flush with the part of the inner surface 3 that is not covered by the retaining structure 4.

Figure 4B:
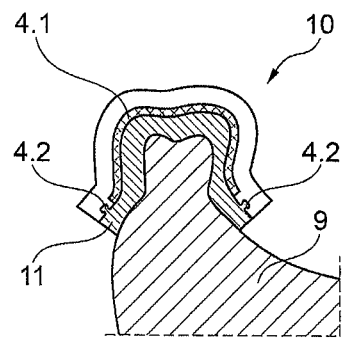

FIG. 4B also shows a sectional view of an impression tray 10 according to the invention placed on a lower jaw 9, wherein the impression tray 10 comprises two surface subregions with respective different retaining structures 4.1, 4.2. While a first surface subregion with the first retaining structure 4.1 extends over the surface of a core region of the inner surface 3, the second surface subregion is arranged in strips along an edge region of the inner surface 3. The second retaining structure 4.2 in the second surface subregion 15 is omega-shaped, configured using a wraparound technique, which ensures a particularly high retention force in the edge region.

An impression compound 11 is disposed between the retaining structure 4, and optionally a part of the inner surface 3 not covered by the retaining structure 4, and the part of the lower jaw 9 covered by the impression tray. The impression compound 11 is soft and/or viscous when the impression tray 10 is placed onto the lower jaw 9. The soft impression compound 11 conforms exactly to the shape of the teeth and the adjoining gums of the lower jaw 9 and also flows into the undercuts 8. After the impression compound 11 hardens, the impression compound is firmly attached to the carrier 1 of the impression tray 10 due to the undercuts 8 of the retaining structure 4, so that it can be removed completely from the lower jaw 9 together with the impression tray 10.

It goes without saying that an impression of the upper jaw can be produced in a similar manner or, with an impression tray comprising a corresponding inner surface 3 with a retaining structure 4 on two sides, an impression of the upper and the lower jaw can be produced at the same time.

Figure 5:
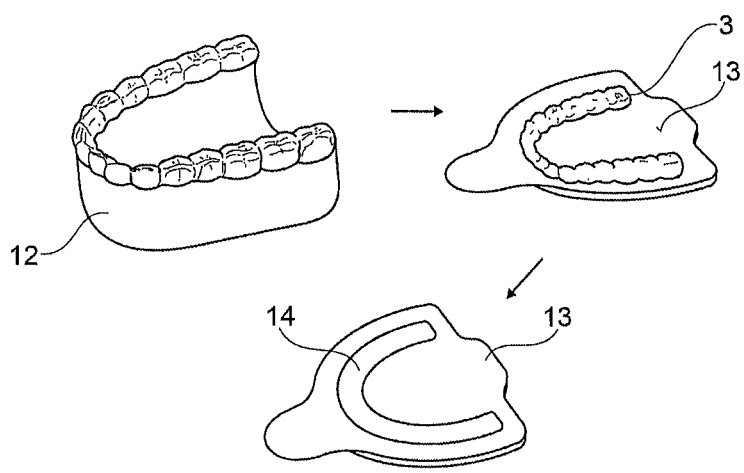

FIG. 5 shows sketches of some method steps of a first embodiment of the method according to the invention. In a first method step, a digital first impression tray model 13 of the impression tray 10 with the carrier 1 with the inner surface 3 is created based on a digital jaw model 12, wherein the inner surface 3 corresponds at least partially to a negative form of the jaw model 12.

In a second method step, at least one surface subregion 14 is marked on the inner surface 3, on which a retaining structure 4 is arranged in a third method step and stored as a production template.

The arrangement of the retaining structure can, for example, include the digital placement of a flat retaining structure 4 onto the surface subregion, the recessing of the surface subregion 14 with subsequent placement of a flat retaining structure 4 onto the recessed surface, creation of a retaining structure 4 by creating depressions and undercuts in the surface subregion 14, or similar steps.

Subsequently, in a fourth method step, the impression tray is produced according to the production template.

The invention claimed is:

1. Method for producing an individualized dental impression tray, comprising the steps of:
    obtaining a digital jaw model or a digital jaw region model;
    creating a digital first impression tray model of an individualized impression tray on the basis of the digital jaw model or of the digital jaw region model of an individual, wherein the digital first impression tray model has a carrier with at least one inner surface shaped to receive the occlusal, labial and lingual surfaces of an individual's teeth,
    configuring the inner surface to correspond to an enlarged negative form of the individual's teeth and adjoining gums of the individual including the occlusal, labial and lingual surfaces of the teeth by configuring the inner surface to be a pre-defined uniform distance from an outer contour of the digital jaw model or the digital jaw region model of the individual;
    automatically marking, based on a predetermined criteria, at least one virtual surface subregion on the inner surface,
    arranging a virtual three-dimensional retaining structure above and/or below the at least one virtual surface subregion to face the occlusal, labial and lingual surfaces of the individual's teeth by:
    designing the virtual three-dimensional retaining structure to have a first surface which extends substantially parallel to the at least one virtual surface subregion and has at least one recess running through it, the at least one recess is designed to have at least one undercut;
    storing the digital first impression tray model with the virtual three-dimensional retaining structure as a production template and
    producing a physical impression tray using the production template.

2. Method according to claim 1, further comprising automatically specifying a density, a shape, and a size of a plurality of recesses and a shape and size of the undercuts.

3. Method according to claim 1, further comprising:
    digitally recessing, responsive to the determining step, the at least one virtual surface subregion by a depth into the carrier relative to a part of the inner surface not belonging to the virtual surface subregion, wherein the virtual three-dimensional retaining structure, which is subsequently arranged on the at least one virtual surface subregion, has a height relative to the virtual surface subregion, that corresponds to said depth.

4. Method according to claim 1, wherein a plurality of virtual surface subregions are marked by hand and/or automatically and identical and/or different virtual three-dimensional retaining structures are respectively arranged above and/or below the different virtual surface subregions.

5. Method according to claim 4, wherein the different virtual three-dimensional retaining structures differ with respect to a density of the recesses and/or the shape of the recesses and/or the size of the recesses and/or with respect to the shape of the undercuts and/or with respect to the size of the undercuts.

6. Method according to claim 4, wherein the virtual three-dimensional retaining structure for at least one of the plurality of virtual surface subregions is selected depending on a maximum force acting on a corresponding physical surface subregion when the impression tray is being used and/or depending on a desired holding force for the corresponding physical surface subregion and/or depending on a viscosity of an impression compound to be used for creating an impression.

7. Method according to claim 1, wherein the virtual three-dimensional retaining structure includes a plurality of adjacently arranged virtual retaining elements, wherein a three-dimensional shape of the retaining elements and/or a density of the retaining elements are specified automatically and/or by hand.

8. Method according to claim 1, wherein the producing includes machining or additive manufacturing.

9. Method according to claim 1, further comprising manually specifying a density, a shape, and a size of a plurality of recesses and a shape and size of the undercuts.

10. Method according to claim 1, wherein the pre-defined uniform distance is between of 0.5 mm and 3 mm.

11. Method according to claim 1, wherein the pre-defined uniform distance is 0.1 mm.

12. Individualized dental impression tray comprising;
    a carrier with an inner surface shaped to receive the occlusal, labial and lingual surfaces of an individual's teeth and an outer surface,
    the inner surface is adapted to correspond to an enlarged negative form of the individual's teeth and adjoining gums including the occlusal, labial and lingual surfaces of the teeth, the inner surface being configured to be a pre-defined uniform distance from an outer contour of the individual's teeth and adjoining gums, and at least one surface subregion of the inner surface adapted to face the occlusal, labial and lingual surfaces of the individual's teeth is covered with a retaining structure;
    wherein the retaining structure has a first surface which extends substantially parallel to the surface subregion and has a plurality of recesses with undercuts running through it, and,
    wherein integration of the pre-defined uniform distance produces a configuration that ensures a uniform thickness and pressure on an impression compound distributed over the individualized impression tray.

13. Impression tray according to claim 12, wherein 50% of the surface subregion is covered by the first surface and 50% of said surface subregion is covered by the recesses.

14. Impression tray according to claim 12, wherein the undercuts extend under at least 30% of the first surface.

15. Impression tray according to claim 12, wherein the retaining structure includes a plurality of adjacently arranged retaining elements.

16. Impression tray according to claim 15, wherein the retaining elements are designed to be T-shaped or X-shaped or V-shaped.

17. Impression tray according to claim 12, wherein the surface subregion occupies at least 50% of the inner surface of the carrier.

18. Impression tray according to claim 12, wherein a distance between the first surface of the retaining structure and the surface subregion of the inner surface of the carrier and/or a base of at least one depression of the at least one recess is 0.1 mm to 0.5 mm.

19. Impression tray according to claim 12, wherein the surface subregion is configured as a base of a depression in the inner surface of the carrier, wherein a depth of the depression corresponds to an extent of the retaining structure perpendicular to the first surface of the retaining structure.

20. Impression tray according to claim 12, wherein the retaining structure and the carrier are formed as a single piece.

21. Impression tray according to claim 12, wherein the pre-defined uniform distance is between of 0.5 mm and 3 mm.

* * * * *